United States Patent Office 3,598,874
Patented Aug. 10, 1971

3,598,874
PREPARATION OF CHLOROHYDRINS BY REACTING HYPOCHLOROUS ACID AND LONG-CHAIN OLEFINS
Richard K. Kloss, Forest Park, Gene W. Claybaugh, Green Township, Hamilton County, and David D. Whyte, Wyoming, Ohio, assignors to The Procter & Gamble Company, Cincinnati, Ohio
No Drawing. Filed May 9, 1969, Ser. No. 823,476
Int. Cl. C07c 31/34
U.S. Cl. 260—634
12 Claims

ABSTRACT OF THE DISCLOSURE

A process for preparing high molecular weight chlorohydrins comprises reacting dilute solutions of long-chain olefins with dilute hypochlorous acid in a 2-phase reaction for short reaction times to achieve low olefin conversions which minimize formation of undesirable by-products.

BACKGROUND OF THE INVENTION

Chlorohydrins represent a group of compounds important because of their use as intermediates in the preparation of many other useful compounds, particularly alkyl epoxides (also termed alkylene oxides) which additionally serve as versatile building blocks for other useful compounds.

In the detergent industry, the derivatives of higher alkyl epoxides (i.e., epoxides containing from 8 to 30 carbon atoms) find important use as surfactants. However, a major detriment to the use of higher alkyl epoxides in this industry has been their high cost, which results from the lack of a feasible and economical synthesis.

The prior art suggests a method for reacting olefins with hypochlorous acid to form chlorohydrins. This method has generally been unacceptable because of a large amount of undesirable by-products, particularly high molecular weight compounds and dichloroalkanes, and poor yield of chlorohydrins obtained if long chain olefins are used as an initial reactant.

In attempting to achieve high chlorohydrin yields by the above method, the prior art has suggested various refinements of the general reaction. It has been suggested that an aqueous solution of pure HOCl be used, that temperature ranges or pH levels be controlled, that a 2-phase emulsion be used as a reaction medium, or that the chlorohydrin be removed from the reaction medium upon formation. However, the prior art has failed to realize the significance of the above suggestions in combination with other aspects, such as the use of a water-immiscible solvent, dilute olefin concentrations, and short reaction times. Such uses achieve low olefin conversions which in turn substantially reduce the formation of by-products and provide high chlorohydrin yield.

Therefore, it is an object of this invention to provide chlorohydrins in high yield from a reaction of long-chain olefins and hypochlorous acid.

It is another object of this invention to provide a process for preparing chlorohydrins from long-chain olefins and hypochlorous acid, in which the formation of undesirable by-products is substantially reduced.

BRIEF SUMMARY OF THE INVENTION

These and other objects are achieved by the invention herein which comprises a method of preparing chlorohydrins from long-chain olefins and hypochlorous acid. The long-chain olefins, described herein, are those olefins containing from 8 to about 30 carbon atoms.

Briefly, the process herein comprises the addition of HOCL (hypochlorous acid) to the double bond of a long-chain olefin in accordance with the following reaction:

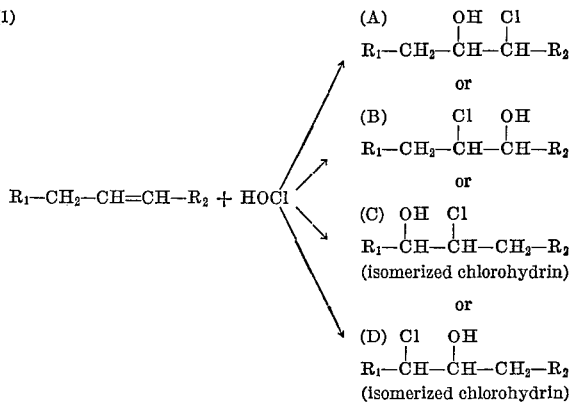

wherein $R_1$ is an alkyl, $R_2$ is hydrogen or an alkyl, and the sum of the number of carbon atoms of $R_1$ or $R_1$ plus $R_2$, where $R_2$ is an alkyl, is from 5 to about 27. The product of the reaction (Formulae A, B, C or D above) is termed herein a "chlorohydrin," the chain length of which corresponds to the number of carbon atoms in the long-chain olefin reactant. The initial reaction media consists of two phases: (1) a non-aqueous phase which consists essentially of a long-chain olefin and a water-immiscible solvent; and (2) an aqueous phase which consists essentially of an aqueous solution of the hypochlorous acid. The long-chain olefin and the hypochlorous acid are diluted, respectively, in a water-immiscible solvent and water. The two phases are put into a reaction vessel and then emulsified by continuous agitation (e.g., stirring) throughout the reaction which is allowed to proceed for a short time, no longer than about 12 minutes. The use of short reaction times achieves low olefin conversions. The phrase "olefin conversion," as used herein, means the amount of long-chain olefin which has, during the course of the reaction, formed a chlorohydrin or a by-product; this amount is determined by vapor phase chromatography and is reported herein in area percent. The olefin conversions used herein range from about 5% to about 25% and are termed herein "low olefin conversions."

During the course of the reaction, the initial concentrations of long-chain olefin in the non-aqueous phase and of hypochlorous acid in the aqueous phase are reduced in the course of the formation of chlorohydrin, as well as by-products; the chlorohydrin and by-products form in the non-aqueous phase. Accordingly, the terms "non-aqueous solution" and "aqueous solution" are used herein to distinguish the end-reaction media from the initial-reaction media (the two phases) defined above.

The reaction is stopped by ceasing agitation; then, the non-aqueous solution (essentially containing chlorohydrin, unreacted long-chain olefin, and solvent) separates from the aqueous solution. The chlorohydrin is separated from the non-aqueous solution, e.g., by extraction. The remaining solvent and unreacted long-chain olefin are then preferably reconstituted to a non-aqueous phase of desired reaction concentration, recycled, and reacted with additional hypochlorous acid (in an aqueous phase).

The yield of chlorohydrin is based on the converted long chain olefin; chlorohydrin yield is determined by vapor phase chromatography and is reported herein in area percent. Chlorohydrin yields achieved by the process herein are generally about 80% to 90%. The resulting chlorohydrin can then be reacted with strong base to form a higher alkyl epoxide, corresponding in carbon chain length to the carbon chain length of the chlorohydrin and of the long-chain olefin initial reactant.

Practice of the process herein eliminates or reduces formation of undesirable by-products associated with the prior art practice of the above addition reaction, reaction (1). These by-products comprise dichloroalkanes (the alkane moiety of which corresponds to the chain length of the long-chain olefin) and high molecular-weight compounds (e.g., condensation products of the long-chain olefin with formed chlorohydrin and/or with other reaction products). These by-products generally occur in large amounts; the formation of the high molecular weight compounds is especially noted with long-chain olefin reactants. As these by-products form, less long-chain olefin is available to react with hypochlorous acid and chlorohydrin is lost in the formation of the undesired condensates and dichloralkanes, resulting in lower chlorohydrin yield. By use of the specific reaction conditions of this invention, especially the short reaction times to achieve low olefin conversions and the dilute olefin concentrations in a water-immiscible solvent, applicants have found that the formation of undesirable by-products is reduced and, at the same time, maximum yields of chlorohydrin can be obtained.

DETAILED DESCRIPTION OF THE INVENTION

According to the invention herein, chlorohydrins are prepared in high yields from the reaction of long-chain olefins with hypochlorous acid in accordince with reaction (1) above.

The long-chain olefins of this invention contain from about 8 to about 30, preferably from 12 to 20 and particularly from 12 to 18, carbon atoms. Preferably, pure or substantially pure long-chain olefins are employed. Preferably, the olefins are straight-chain, although branched and cyclic long-chain olefins can be used. Preferably, the olefinic or double bond is in a terminal position (e.g., 1-alkene), although long-chain olefins containing an internally positioned double bond can be used.

Examples of preferred long-chain olefins in the invention herein include the alkenes 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, and 1-triacontene.

The reaction herein is believed to take place at the interface between the phases of a 2-phase (aqueous/non-aqueous) reaction system. High chlorohydrin yield is obtained for the first and any succeeding low olefin conversion by diluting the long-chain olefin reactant with a water-immiscible, inert solvent, preferably of low molecular weight and low viscosity. Preferably, the solvent has a boiling point lower than 100° C.

Since the reaction is believed to occur at the interface of the two phase, agitation (e.g., with a mixer) of the phases increases the reaction rate. While a high shear mixer and undiluted long-chain olefin can result in increasing the interfacial area of the reaction and, therefore, the reaction rate, the formation of high molecular weight by-products is prohibitive. By employing dilute long-chain olefins herein, high interfacial areas and fast reaction rates are achieved at reasonable shear rates with a substantial reduction in the formation of the high molecular weight by-products.

Additionally, dilution of the long-chain olefin retards the formation of high molecular weight by-products, which are formed in the non-aqueous phase from a bimolecular reaction between unreacted long-chain olefin and chlorohydrin or other reaction products already formed. By suppressing formation of these by-products, higher chlorohydrin yield is achieved.

Accordingly, the process herein initially comprises a non-aqueous phase which consists essentially of from 5% to 50%, preferably from 5% to 37.5%, by weight of a long-chain olefin and from 95% to 50%, preferably from 95% to 62.5%, by weight of a water-immiscible, inert solvent. Particularly preferred embodiments of the process herein comprise a non-aqueous phase consisting essentially of from 5% to 25% by weight of a long-chain olefin and from 95% to 75% by weight of a solvent.

Examples of water-immiscible, inert solvents, which can be used herein, are known in the art. Generally, solvents suitable for use herein can be selected from the group consisting of:

(A) straight- and branched-chain alkanes, e.g., hexane, octane, decane, tetradecane, 2-ethyl octane, 2,4-dimethyl hexadecane, and petroleum ether;

(B) straight- and branched-chain alkyl halides, e.g., (1) monohaloalkanes, such as 1-chlorododecane, 2-chlorodecane, 1-bromohexane, 1-bromo-3-methyl butane, 2-bromooctane, and 1-fluoroheptane; and, (2) polyhaloalkanes, such as 1,4-dichlorodecane, 1,6-dicholor-3-methylheptane, 1-chloro-3-bromohexane, 1,2-difluoro-2-chloroethane, carbon tetrachloride, and chloroform;

(C) aliphatic and cyclic ketones (including halogenated variations), e.g., 2-octanone, cyclohexanone, 2-fluoro-6-heptanone, and 4-heptanone;

(D) cycloaliphatics (including halogenated variations), e.g., cyclohexane, cyclooctane, ethyl cyclohexane, 2,4-dimethyl cyclohexane, chloro-cyclooctane, 1-chloro-4-bromo cyclohexane, hexachlorocyclohexane, and decahydronaphthalene;

(E) aliphatic and cyclic ethers (including halogenated variations), e.g., diethyl ether, dioxane, methylbutyl ether, dibutyl ether, bis-2-chloroethyl ether, and tetrahydrofuran; and, (F) inert aromatic hydrocarbons (especially polyhalogenated variations), e.g., 1,3-dichlorobenzene, 1-chloro-3-fluorobenzene, 1-methyl-3-fluorobenzene, and 1-isopropyl-3,4-dichlorobenzene.

Solvents preferred for use herein are decane and chloroform, particularly petroleum ether.

The aqueous phase comprises hypochlorous acid in water. Hypochlorous acid is commercially available, and it can be synthesized by methods known in the art. Such methods include, for example, passing chlorine gas into water to form chlorine-water which is an aqueous solution comprising hypochlorous acid and hydrochloric acid.

In the synthesis of hypochlorous acid by the above or other methods, there generally occurs in the chlorine-water solution some free chloride ions (from the dissociation of hydrochloric acid) and free molecular chlorine which are believed to cause the formation of an undesirable by-product, dichloroalkane.

The formation of this by-product is exemplified by the reaction:

(2) $CH_3-(CH_2)_9-CH=CH_2 + HOCl + Cl^- + Cl_2 \longrightarrow$

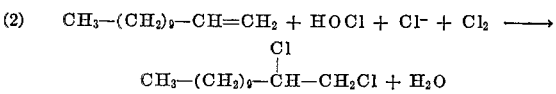

This reaction reduces the amount of long-chain olefin available for reaction with hypochlorous acid and thereby reduces chlorohydrin yield.

Although not essential to the invention herein, it is preferred that the hypochlorous acid solution be essentially chloride-free in order to achieve maximum chlorohydrin yield during low olefin conversions. Methods of preparing chloride-free hypochlorous acid solutions are known in the art; for example, see R. M. Chapin, "The Effect of Hydrogen-Ion Concentration on the Decomposition of Hypohalites," Journal of the American Chemical Society, vol. 56 (November 1934) at page 2211 et seq.

Highly dilute concentrations of hypochlorous acid are used herein. Specifically, the process herein comprises an aqueous phase comprising from 0.1% to 6%, preferably from 0.25% to 1.5%, by weight hypochlorous acid and from 99.9% to 94%, preferably from 99.75% to 98.5%, by weight water. If concentrations of hypochlorous acid greater than 6% by weight are used herein, control of the reaction is difficult and it becomes difficult to stop the reaction before a significant amount of unwanted by-product has formed.

The pH of the aqueous phase affects the reaction rate and, therefore, the level of olefin conversion achieved for a given reaction time. The pH's employed herein can vary dependent upon whether or not the aqueous phase contains free chloride ions and molecular chlorine or is essentially chloride- and chlorine-free. In either event, the maximum pH is about 8; the reaction herein does not occur at a pH of about 9 or above. When the aqueous phase contains free chloride ions and molecular chlorine, the pH should not be below about 4.5; below about 4.5, the reaction results in the prohibitive formation of dichloroalkanes. When an essentially chloride- and chlorine-free aqueous solution is employed herein, the pH can range down to about 1; below about 1, prohibitive decomposition of hypochlorous acid can occur.

Accordingly, the process herein comprises an aqueous phase having a pH of from about 1 to about 8, preferably from about 3 to about 8; chlorohydrin yield is particularly good in low olefin conversions when an aqueous phase having a pH of about 6 is employed herein.

A desired aqueous phase pH is obtained by adding a sufficient amount of a basic compound to the hypochlorous acid solution; strong bases, such as sodium and potassium hydroxide, are particularly useful in this respect.

The reaction herein comprises agitating the aqueous phase with the non-aqueous phase at weight ratios ranging from 125:1 to 1:3, preferably from 20:1 to 1:1, respectively.

The molar ratio of hypochlorous acid to the long-chain olefin can range from about 10:1 to about 1:8 respectively, and preferably is 1:1.

The two phases are placed together in a reaction vessel and are vigorously agitated for the entire reaction time. Vigorous agitation produces an emulsion of the two phases and substantially increases the interfacial or reaction surface area, thereby resulting in rapid reaction rates, which at the short reaction times employed herein, achieve low olefin conversions which provide high chlorohydrin yield.

Temperatures at which the reaction is maintained are not particularly crtical. Temperatures ranging from 0° C. to 25° C., particularly about 15° C., are preferred herein to provide control of the reaction during a low olefin conversion and to prevent decomposition of hypochlorous acid.

Any practical pressure can be used in the invention herein, although pressures about atmospheric are preferred for convenience.

Essential to the process herein is a short reaction time, the effect of which is to achieve low olefin conversions and high chlorohydrin yield.

Applicants have found that a high chlorohydrin yield (about 80 percent to 90 percent based on the amount of olefin conversion) is obtained when the olefin conversion is from about 5% to about 25%. If the reaction is allowed to continue beyond the point of about 25% olefin conversion, the yield of chlorohydrin rapidly decreases and the amount of undesirable by-products increases due to previously formed chlorohydrin, as well as other reaction products, reacting with unreacted long-chain olefin to form undesirable high molecular weight by-products. If the olefin conversion is less than about 5%, chlorohydrin yield is undesirably low. To achieve this essential low olefin conversion, the process herein comprises reacting the aqueous phase with the non-aqueous phase with agitation for short reaction times of from 0.1 to 12 minutes, whereby the olefin conversion ranges from about 5% to about 25%.

The reaction time range of from 0.1 to 12 minutes suffices to produce low olefin conversions at the reaction conditions (e.g., the concentrations of hypochlorous acid and long-chain olefin and the aqueous phase pH's) empolyed herein. Optimal reaction times for specific reaction conditions can easily be experimentally determined. For example, the reaction time decreases proportionally with an increase in the concentration of hypochlorous acid (other reaction conditions being constant; additionally, the reaction time decreases with an increase in the aqueous phase pH up to about pH 6, above which the reaction time increases with an increase in the aqueous phase pH. When the preferred 0.5% to 1.5% by weight concentrations of hypochlorous acid are employed at a pH about 6, the reaction times preferably range from 0.5 minute to 6 minutes. Hypochlorous acid concentrations above 6% by weight and a pH lower than about 1 should not be used.

When the agitation and the olefin conversion is stopped within these time ranges, the non-aqueous solution separated from the aqueous solution. When the agitation of the reaction phases is stopped, the reaction vessel is permitted to stand undisturbed so that the emulsified reaction phases can return to the original layered positions of the two phases (aqueous and non-aqueous). This layering takes place very quickly and readily.

The non-aqueous solution is easily drawn off from the aqueous solution by techniques known in the art, e.g., by means of decanting in a separation funnel. At this point, the non-aqueous solution consists essentially of unreacted long-chain olefin, solvent, and chlorohydrin reaction product. Although not essential to the process herein, the non-aqueous solution is preferably "dried" with an inert, anhydrous compound to remove any remaining water in the solution; anhydrous sodium sulfate ($Na_2SO_4$) is a particularly useful drying agent for this purpose.

The chlorohydrin reaction product is then separated from the remainder of the non-aqueous solution, i.e., essentially, the unreacted long-chain olefin and solvent. Separation of the chlorohydrin is easily effected by conventional techniques, such as distillation or extraction.

The chlorohydrin yield is high, ranging from about 80% to 90%; yield percentages are based on the amount of long-chain olefin converted.

The use of a low olefin conversion in the process herein additionally obviates the need for complicated processes and processing equipment which are necessary to remove chlorohydrin reaction product from the reaction media immediately upon formation. Moreover, to provide a suitable and economical commercial operation pursuant to this invention, the unreacted long-chain olefin and solvent can preferably be re-used.

Accordingly, after removal of chlorohydrin from the non-aqueous solution, the remainder of the non-aqueous solution can be treated to remove any impurities (e.g., by-products) resulting from the previous reaction; distillation, for example, is a suitable means of treatment for this purpose.

Preferably the process herein continues by reconstituting the non-aqueous solution, containing unreacted long-chain olefin and solvent, to a non-aqueous phase of from 5% to 50%, preferably from 5% to 37.5%, particularly from 5% to 25%, by weight of long-chain olefin and from 95% to 50%, preferably from 95% to 62.5%, particularly from 95 to 75%, by weight of the solvent and recycling the reconstituted non-aqueous phase into an aqueous phase comprising from 0.1% to 6%, preferably from 0.25% to 1.5%, by weight of hypochlorous acid and from 99.9% to 94%, preferably 99.75% to 98.5%, by weight of water.

The non-aqueous and aqueous phases are again reacted with agitation in accordance with the invention steps described above.

Thus, by such a recycling, the expensive long-chain olefin can be fully utilized, and an economical process is achieved.

After separation from the unreacted long-chain olefin and solvent, the chlorohydrin reaction product can then be led into a reaction vessel wherein it can be converted into a corresponding higher alkyl epoxide by known procedures, e.g., by reaction with a strong base such as sodium or potassium hydroxide.

The process is adaptable to the incorporation of the epoxidation step (i.e., the conversion of chlorohydrin to a higher alkyl epoxide) prior to the separation of chlorohydrin reaction product from the non-aqueous solution containing unreacted long-chain olefin and solvent. The non-aqueous solution can be drawn off from the aqueous solution and into a reaction vessel wherein chlorohydrin in the non-aqueous solution is converted to its corresponding higher alkyl epoxide by reaction with sodium or potassium hydroxide, thereafter separating the resulting higher alkyl epoxide, from the remaining solution comprising unreacted long-chain olefin, solvent, and unreacted chlorohydrin. If desired, the unreacted long-chain olefin and solvent can be separated and reconstituted to a non-aqueous phase having the concentrations described above and recycling the reconstituted phase into reaction with an aqueous phase, having concentrations of hypochlorous acid and water disclosed above.

After the non-aqueous solution has been removed, the aqueous solution containing unreacted hypochlorous acid and water can, if desired, similarly be reconstituted to an aqueous phase having desired hypochlorous acid and water concentrations and recycled for reaction with additional non-aqueous phase, or a fresh aqueous phase can be prepared for a subsequent reaction.

The following examples are intended to illustrate particular embodiments of the invention herein and do not limit said invention. Further, other embodiments within the scope of the invention herein will be obvious to those skilled in the art after reading this description.

Vapor phase chromatographic (V.P.C.) techniques were used to determine type and amount of reaction products. A ten foot, ¼", 15% Carbowax-20M coated, 60/70 Anakrom ABS column was used in V.P.C. analysis, the column was programmed from 100° C. to 240° C. at 4° C./minute, and the samples were injected at a flow rate of about 70 milliliters of helium per minute (S.T.P.). V.P.C. peaks were used to determine product type, in accordance with conventional methods. The olefin conversions and all yields are expressed in V.P.C. area percent; approximate response factors, derived from known samples, were as follows:

(1) Long-chain olefin (reference) _____ −1.0
(2) Primary chlorohydrins _____ −2.3
(3) Isomerized chlorohydrins _____ −1.3
(4) All by-products, except the high molecular weight by-products _____ −1.0
(5) High molecular weight-by-products _____ −3.0

Thus, the actual olefin conversions and chlorohydrin yields were higher than those reported below when calculated from the response factors and V.P.C. area percents.

Percentages of hypochlorous acid, water, long-chain olefin, and solvent are expressed by weight.

In Examples I through X, an essentially chlorine- and chloride-free aqueous phase was employed. This phase was prepared by the chlorination-distillation method suggested by R. M. Chapin, supra.; using conventional techniques, the distillate was determined to have a 4.5% hypochlorous acid concentration and a pH of 2.3. Deionized water was added to the distillate in an amount sufficient to obtain an aqueous phase having a desired hypochlorous acid concentration; the amount of hypochlorous acid (i.e., in grams and by moles) in the phase was then determined on the basis of the gram weight of the aqueous phase. Sodium hydroxide (4 M) was then added to the phase in an amount sufficient to obtain a desired pH.

In Examples XI through XX, the aqueous phase contained free molecular chlorine and chloride ions. This phase was prepared by bubbling chlorine gas into water, contained in a 3 liter flask set into an ice bath, until the water turned green in color. Using the procedure described above, a desired hypochlorous acid concentration and aqueous phase pH were obtained by the addition of a sufficient amount of deionized water and 4 M sodium hydroxide.

In all examples, the reaction was conducted at about 15° C. by maintaining the reaction flask in an ice bath and at atmospheric pressure. Unless noted otherwise, 1-dodecene was the long-chain olefin reactant and reacted with HOCl to form dodecyl chlorohydrin, either as the primary chlorohydrin reaction product (i.e., 2-hydroxy dodecyl chloride or 2-chlorododecanol) or as an isomerized chlorohydrin reaction product (in which the double bond had shifted or isomerized to an internal position and the hypochlorous acid reacted at the internal site), or both.

EXAMPLE I

A non-aqueous phase, consisting essentially of 33.6 grams of 25% long-chain olefin and 75% solvent, was prepared by dissolving 8.4 grams (0.05 mole) of essentially pure 1-dodecene in 25.2 grams of petroleum ether. The phase was then placed into a 2 liter, baffled, round-bottom, three-necked reaction flask which was set into an ice bath.

A mechanical stirrer, placed through the center-neck of the flask, was started, and 525 grams of an aqueous phase (pH of 6), comprising 0.5% hypochlorous acid (2.62 grams; 0.05 mole) and 99.5% water, was added to the reaction flask. An emulsion of the two phases, i.e., the reaction media, was created by the agitation which was continued throughout the reaction.

After adding the aqueous phase, samples of the reaction media were withdrawn by pipette without stopping the agitation and placed into small flasks. The samples, A, B and C, were taken at reaction times of 1, 3, and 6 minutes respectively; enough reaction media was taken in each sample to provide about 1 ml. of the non-aqueous solution upon allowing the sample to stand undisturbed in order that the emulsified reaction media could separate into aqueous and non-aqueous solutions.

The non-aqueous solution of each sample, containing chlorohydrin reaction product, was separated from the aqueous solution by means of a separation funnel, placed into another flask, "dried" by adding anhydrous sodium sulfate, and filtered. The non-aqueous solution of each sample was then diluted with about 30 ml. of petroleum ether and placed into a freezer to await V.P.C. analysis.

Immediately prior to undergoing V.P.C. analysis, each sample was removed from the freezer and the petroleum ether evaporated off under a fast flow of nitrogen gas for about 15 minutes. The samples were then analyzed and product yields determined; results, which demonstrate the high chlorohydrin yield and substantially small formation of by-products obtained by the process herein, are reported in Table I below.

In a preferred embodiment of the process which employs recycling, the agitation is stopped after completion of the 1, 3, or 6 minute reaction times, and the reaction flask is not disturbed for about 1 to 20 minutes to allow the reaction media to separate into aqueous and non-aqueous solutions. The non-aqueous solution is separated from the aqueous solution, dried with anhydrous sodium sulfate, and filtered. Chlorohydrin and by-products are removed from the non-aqueous solution by distilling off the unreacted 1-dodecene (and any reaction isomers) and petroleum ether. The unreacted long-chain olefin and solvent in the non-aqueous solution are then reconstituted into a non-aqueous phase having 25% long-chain olefin and 75% solvent by adding 1-dodecene in an amount sufficient to replenish the amount lost in olefin conversion and by adding petroleum ether in amount sufficient to provide the desired 1-dodecene concentration.

The now reconstituted non-aqueous phase is then recycled into the reaction flask and is reacted with additional aqueous phase of the same capacities in the aforedescribed manner.

EXAMPLE II

Results similar to the results of Example I were achieved when a random, internal long-chain olefin, which consisted essentially of, by weight, 80% 2-dodecene and 20% random internal dodecenes, was substituted for 1-dodecene in Example I to obtain the corresponding primary dodecyl chlorohydrin, i.e., 2-chloro-3-hydroxy dodecane and/or 3-chloro-2-hydroxy dodecane, as well as isomerized dodecyl chlorohydrins.

EXAMPLE III

Results similar to the results of Example I were achieved when n-decane and chloroform were respectively substituted for the petroleum ether in Example I.

EXAMPLE IV

Similar results were obtained when the process of Example I was repeated substituting an aqueous phase having a pH of 3 (hypochlorous acid concentration and molarity remaining the same) as an initial reactant.

Samples D and E, taken at about 2 and about 4 minutes respectively were analyzed and provided the data reported in the table below.

The reaction media herein, following completion of the reaction time, are treated as described in Example I to accomplish re-use of unreacted long-chain olefin and solvent through reconstitution and recycling.

EXAMPLE V

Similar results were achieved when Example I was repeated substituting an aqueous phase having a pH of 3 (hypochlorous acid concentration and molarity remaining the same) and 67.2 grams of a non-aqueous phase having 12.5% essentially pure long-chain olefin and 87.5% solvent (8.4 grams or 0.05 mole of 1-dodecene dissolved in 58.8 grams of petroleum ether).

Samples F and G, taken at 3 and 6 minutes respectively, were analyzed and resulted in the data reported in Table I below.

An embodiment for the reaction herein is provided by the method disclosed in Example I wherein the non-aqueous solution of the reaction media is separated from the aqueous solution, dried, distilled off from chlorohydrin, reconstituted into a non-aqueous phase, and recycled for reaction with additional aqueous phase.

EXAMPLE VI

The process of Example I was repeated substituting 1,312.5 grams of an aqueous phase (pH of 6) comprising 0.4% hypochlorous acid (5.25 grams or 0.1 mole) and 99.6% water, and 210 grams of a non-aqueous phase, having 8% essentially pure long-chain olefin and 92% solvent (16.8 grams or 0.1 mole of 1-dodecene dissolved in 193.2 grams of petroleum ether).

Samples H, I, and J were taken at 4, 6, and 8 minutes respectively, analyzed, and provided the data reported in Table I below, which data reflects results similar to that of Example I.

Preferably, the process of this example is practiced in accordance with the preferred procedure described in Example I, i.e., separation of the reaction media, treatment of the non-aqueous solution to dry the solution and remove chlorohydrin, and reconstitution and recycling of the non-aqueous solution into further reaction.

EXAMPLE VII

Example VI was repeated substituting an aqueous phase having a pH of 3; the results of samples taken at 4, 6, and 8 minutes were similar to that of Example VI. A preferred practice of the process of this example is achieved by the method described in Example I.

EXAMPLE VIII

Example I was repeated substituting 168 grams of a non-aqueous phase having 5% essentially pure long-chain olefin and 95% solvent (8.4 grams or 0.05 mole of 1-dodecene dissolved in 159.6 grams of petroleum ether).

Sample K, taken at 3 minutes and V.P.C. analyzed, resulted in the data reported in Table I below; the results are similar to that of Example I.

A preferred proces of this example is practiced as described in Example I.

EXAMPLE IX

The process of Example I was repeated substituting 175 grams of an aqueous phase (pH of 6) comprising 1.5% hypochlorous acid (2.62 grams or 0.05 mole) and 98.5% water.

Sample L was taken at 1 minute and V.P.C. analyzed results, which were similar to those of Example I, are reported in the table below.

A preferred practice of the process of this example is achieved by the preferred process described in Example I.

EXAMPLE X

The process of Example IX was repeated substituting 67.2 grams of a non-aqueous phase having 12.5% essentially pure long-chain olefin and 87.5% solvent (8.4 grams or 0.05 mole of 1-dodecene dissolved in 58.8 grams of petroleum ether).

The results, which were similar to that of Example I, are reported below as Sample M.

A preferred practice of the process of this example is achieved in the preferred manner described in Example I.

EXAMPLE XI

The process of Example I was repeated substituting 788 grams of an equivalent aqueous phase (pH of 6) which contained free chloride ions in the water and which had 3.92 grams of 0.075 mole of hypochlorous acid. The 50.4 grams non-aqueous phase contained an equimolar amount of 1-dodecene (12.6 grams in 37.8 grams of petroleum ether).

Samples N, O and P were taken at reaction times of 1, 3, and 5 minutes respectively and were V.P.C. analyzed. The results, which were similar to that of Example I, are reported in Table I below and demonstrate that high chlorohydrin yield and substantially small formation of byproducts are obtained by the process of the invention herein.

The process of this example is preferably practiced in accordance with the preferred method described in Example I.

EXAMPLE XII

Similar results were achieved when Example XI was repeated substituting an aqueous phase having a pH of 7 (hypochlorous acid concentration and molarity remaining the same). The process of this example is preferably practiced in accordance with the preferred method disclosed in Example I.

EXAMPLE XIII

The process of Example XI was repeated substituting 33.6 grams of a non-aqueous phase having 37.5% long-chain olefin and 62.5% solvent (12.6 grams or 0.075 mole of essentially pure 1-dodecene dissolved in 21 grams of petroleum ether).

Samples Q, R and S were taken at 1, 3, and 6 minutes respectively and were V.P.C. analyzed. The results, which were similar to those of Example XII, are repeated in the table below.

The process of this example is preferably practiced by the preferred method in Example I.

EXAMPLE XIV

The process of Example XI is repeated substituting 100.8 grams of a non-aqueous phase having 12.5% long-chain olefin and 87.5% solvent (12.6 grams of esssentially pure 1-dodecene dissolved in 88.2 grams of petroleum ether).

Samples T, U, and V, taken at 3, 8, and 12 minutes respectively, were analyzed and resulted in the data reported in Table I below, which data is similar to that of Example I.

The process of this example is preferably practiced in accordance with the preferred method described in Example I.

EXAMPLE XV

The process of Example XI was repeated substituting 263 grams of an aqueous phase comprising 1.5% hypochlorous acid (3.94 grams or 0.075 mole) and 98.5% water, and having a pH of 7.

Samples W, X, and Y were taken at 3, 6, and 9 minutes respectively and analyzed; results, which were similar to that of Example I, are reported in the table below.

Commercial practice of the process of this example is preferably achieved by utilizing the preferred method described in Example I.

EXAMPLE XVI

The process of Example XI was repeated substituting 1,576 grams of an aqueous phase comprising 0.25% hypochlorous acid (molarity of hypochlorous acid and pH of the phase remaining the same) and 99.75% water.

Samples AA, BB, CC, and DD were taken at 2, 5, 8, and 12 minutes respectively and analyzed. The results were similar to that of Example I and are reported in Table I below.

The process of this example is preferably practiced in accordance with the preferred method described in Example I.

EXAMPLE XVII

The process of Example XI was repeated substituting 575.2 grams of an aqueous phase comprising 0.685% hypochlorous acid (the molarity of hypochlorous acid and the pH of the phase remaining the same) and 99.315% water.

Samples EE and FF were taken at 0.5 and 2 minutes respectively and analyzed. The results, which were similar to those of Example I, are reported in Table I below.

The process of this example is preferably practiced in accordance with the preferred method described in Example I.

EXAMPLE XVIII

Results similar to that of Example I were achieved when the process of Example XI was repeated substituting separately 525.3 grams and 394 grams of an aqueous phase, comprising respectively 0.75% and 1.0% hypochlorous acid (molarity and phase pH remaining the same) and 99.25% and 99% water, for reaction times of from 1 minute to 5 minutes.

Practice of the process of this example preferably is achieved by the preferred method described in Example I.

EXAMPLE XIX

Results similar to that of Example I are achieved when the process of Example XI is repeated substituting 98.5 grams of an aqueous phase comprising 4% hypochlorous acid (hypochlorous acid molarity and aqueous phase pH remaining the same) and 96% water, for reaction times of from 0.1 to about 0.5 minute.

Commercial practice of the process herein is preferably achieved by the preferred method disclosed in Example I.

EXAMPLE XX

Similar results are achieved when the process of Example XI is repeated substituting 3,940 grams of an aqueous phase comprising 0.1% hypochlorous acid (hypochlorous acid molarity and phase pH remaining the same) and 99.9% water, for reaction times of from 6 to 12 minutes.

Practice of this process preferably employs the preferred process described in Example I.

The dodecyl chlorohydrin formed in the foregoing examples can readily be converted to its corresponding higher alkyl epoxide, dodecyl epoxide, by reacting the dodecyl chlorohydrin with a strong base. For example, a 60% aqueous solution of 4 moles of sodium hydroxide can be added dropwise over 14 minutes to 1 mole of dodecyl chlorohydrin diluted to 25% (by weight) with petroleum ether and the reaction media agitated at about 182° F. for about 2 or 3 hours to obtain a high yield of dodecyl epoxide, which is useful in the formulation or preparation of detergent compositions.

When 1-octene, 1-nonene, 1-decene, 1-undecene, 1-tridecene, 1-tetradecene, 1-pentadecene, 1-hexdecene, 1-heptadecene, 1-octadecen, 1-nonadcene, 1-eicosene, 1-heneicosene, 1-docosene, 1-tricosene, 1-tetracosene, 1-pentacosene, 1-hexacosene, 1-heptacosene, 1-octacosene, 1-nonacosene, or 1-triacontene is substituted for 1-dodecene in the foregoing examples, similar results are achieved and high yields of the corresponding chlorohydrins are obtained. The resulting chlorohydrins can similarly be converted into corresponding higher alkyl epoxides by the method described above.

Having described the invention herein detail, what is now claimed is:

1. A process for preparing chlorohydrin comprising the steps of:
   (A) preparing an aqueous phase and a non-aqueous phase in weight ratios ranging from 125:1 to 1:3, said aqueous phase comprising from 0.1% to 6% by weight of hypochlorous acid and from 99.9% to 94% by weight of water and having a pH of from about 1 to about 8, said non-aqueous phase comprising from 5% to 50% by weight of an alkene containing from 8 to about 30 carbon atoms and from 95% to 50% by weight of a water-immiscible, inert organic solvent,
   said hypochlorous acid and alkene having molar ratios of from 10:1 to 1:8;
   (B) reacting said aqueous phase with said non-aqueous phase by agitating said phases for from 0.1 to 12 minutes whereby an alkene conversion of from about 5% to about 25% is achieved;
   (C) stopping the agitation; then promptly,
   (D) separating the resulting non-aqueous solution from the resulting aqueous solution; and,
   (E) separating chlorohydrin from the unreacted alkene and solvent of said non-aqueous solution.

2. The process of claim 1 which includes, after step E, the additional steps of:
   (F) reconstituting said unreacted alkene and solvent to a non-aqueous phase of from 5% to 50% by weight of said long-chain olefin and from 95% to 50% by weight of said solvent and recycling said reconstituted non-aqueous phase into an aqueous phase comprising from 0.1% to 6% by weight of hypochlorous acid and from 99.9% to 94% by weight of water;
   (G) repeating steps (A) through (E).

3. The process of claim 2 wherein the non-aqueous phase essentially consists of from 5% to 37.5% by weight of said alkene and from 95% to 62.5% by weight of said solvent.

4. The process of claim 2 wherein the non-aqueous phase essentially consists of from 5% to 25% by weight of said alkene and from 95% to 75% by weight of said solvent.

5. The process of claim 4 wherein the aqueous phase comprises from 0.5% to 1.5% by weight of hypochlorous acid and from 99.5% to 98.5% by weight of water.

6. The process of claim 5 wherein the aqueous phase is essentially chlorine- and chloride-free.

7. The process of claim 6 wherein the reaction time is from 1 minute to 6 minutes.

8. The process of claim 7 wherein the pH of the aqueous phase is 6.

9. The process of claim 8 wherein the solvent is petroleum ether.

10. The process of claim 9 wherein the alkene and hypochlorous acid have a molar ratio of 1:1.

11. The process of claim 10 wherein the alkene contains from 12 to 30 carbon atoms.

12. The process of claim 11 wherein the alkene is 1-dodecene.

References Cited

UNITED STATES PATENTS

| | | | |
|---|---|---|---|
| 1,394,664 | 10/1921 | Brooks | 260—634 |
| 1,456,959 | 5/1923 | Young | 260—634 |
| 1,904,677 | 4/1933 | Cook | 260—634 |

FOREIGN PATENTS

| | | | |
|---|---|---|---|
| 1,172,654 | 6/1964 | Germany | 260—634 |

OTHER REFERENCES

Blouri et al., Bull. Soc. Chim., France, No. 6 1240–4, June 1964.

Guyer et al., Helv. Chim. Acta., 39, pp. 423–9, 1956.

HOWARD T. MARS, Primary Examiner

U.S. Cl. X.R.
260—348, 617